United States Patent Office 3,087,825
Patented Apr. 30, 1963

3,087,825
CORROSION-RESISTANT CEMENTITIOUS MINERAL BUILDING MATERIALS AND METHOD OF PRODUCTION OF THE SAME
Franz Wilhelm Meier-Grolman, Tubingen, Wurttemberg, Germany, assignor to Hermann Karl Meier, Marktredwitz, Germany
No Drawing. Filed June 2, 1959, Ser. No. 817,481
Claims priority, application Germany June 4, 1958
9 Claims. (Cl. 106—89)

The present invention concerns a method for protecting mineral building materials and structural units made therefrom against corrosive action and for simultaneously improving their mineral and mortar properties.

Cement rendering, cement mortar, and concrete are subject to substantial corrosion principally due to leaching and the effect of harmful dissolved salts, inorganic and organic acids, which, depending upon their concentration, sooner or later destroy the building materials or structural units. The restoration of building damage due to corrosion of above-ground structures, bridges, roads, waterways and industrial constructions is not only costly, but also proves that known anti-corrosive measures are not permanently satisfactory.

Mixtures of lime with synthetic and natural pozzuolana, Portland cements having a low lime content or Portland cements with an addition of pozzuolana have been used for a long time to improve the corrosion resistance of cement renderings, cement mortar, and concrete. The thus increased corrosion resistance is usually attributed to the elimination of or reduction of the quantity of soluble calcium hydroxide available, due to a chemical reaction between the calcium hydroxide and reactive compounds of the admixtures by forming water insoluble calcium silicate hydrate gels by the combination thereof with the pozzuolana.

Besides pozzuolana, other substances, such as fluosilicates (silico fluorides), arsenic, oxalic acid, phosphorite and other compounds of phosphoric acid, which form an insoluble compound with the calcium hydroxide have been proposed to increase the corrosion resistance.

All these substances, which were added in amounts approximating as nearly as possible to the stoichiometric ratio for binding the calcium hydroxide (this ratio being determined by the generally accepted theory regarding hydration and setting), never resulted in a practical application despite a proved greater or lesser lime binding effect, either because they reacted with the lime, had an unfavourable influence from a mortar or concrete point of view, or were too expensive when used in the proportions considered absolutely necessary for their efficacy.

According to the present invention, there is provided a method of producing a corrosion-resistant cementitious mineral building material selected from the group comprising cement rendering, cement mortar, and cement concrete, wherein there is added to the cementitious material mixture, prior to its setting, a fluosilicate in an amount substantially less than the stoichiometric quantity required for binding all the lime in the cementitious material mixture.

Such fluosilicate may be added to the mixing water of the cementitious material mixture, or it may be added to the cement of the said mixture. The fluosilicate may preferably be added in an aqueous saturated solution, to which may be added small quantities of reaction-controlling water-soluble organic and/or inorganic substances for controlling the reaction during hydration of the cementitious material. The proportions in which the fluosilicate is added to the cementitious material mixture, with respect to the weight of cement used, are preferably approximately 0.5–1.0% by weight when it is desired to protect above-ground mineral structures against atmospheric corrosion, approximately 0.3% by weight when it is desired to protect underwater structures of mineral material from corrosion, and approximately 0.1% by weight when it is desired to protect mineral structures from attack by organic acids.

Thus, contrary to the previously held expert opinion, there is added to the mixing water sufficient reactive substance to react with the hydrated lime present in the liquid phase during the hydration and setting and with other soluble components of the binding agent during hydration, and causing, if necessary, by the addition of substances controlling reaction to aqueous saturated solutions of the lime binding chemicals, a corresponding change in their reaction conditions with the hydrated lime (calcium hydroxide) in the mortar bed during hydration. Due to the chemical reaction, such a change is effected in the reaction capability of the hydrates of lime and other soluble components of the binding agents, that the building materials or structural units, without reduction of strength and without unfavourable influences on other essential properties of cement rendering, mortar and concrete, are protected to a greater extent than hitherto or in many cases even completely immunized, against corrosive action generally occurring in practice. At the same time, the reaction released by the presence of the lime binding chemicals during the hydration considerably increases the strength and density of the building materials and structural units and improves their workability.

Besides the corrosion protective action due to comparatively small quantities of lime binding substances in the mixing water, which can be explained by the formation of corrosion-resistant reaction products in the capillary pores and/or by the formation of corrosion resistant protective layers, the invention permits a smaller proportion of the expensive additives to be used. For the practical use of chemical admixtures in building materials these economical points of view are of considerable importance. The costs for the admixtures are maintained within tolerable limits in accordance with experience.

It is well-known to add to the mixing water or to the mortar or concrete mix readily soluble chemicals to increase the chemical resistance, which chemicals form chemically resistant compounds, in order thereby to increase the resistance against attack. Extensive research and practical experience has proved, however, that all inorganic and organic compounds in question as admixtures for chemical binding, due to their reaction products with hydrate of lime, have an unfavourable affect on the properties, more especially on the binding and setting, of rendering, cement mortar and concrete. For this reason this possibility of protection against corrosion has no longer been employed since about 1935.

Also according to the present invention, there is provided a corrosion-resistant cementitious mineral building material, the corrosion-resistance, mineral and mortar properties, and frost resistance of which are improved by the presence of fluosilicate in quantities substantially lower than those demanded by the stoichiometric ratio between the hydrate of lime and the lime-binding chemical reaction partner for hydration of the binding agents.

*Example for use in connection with bridge construction.*—Silicon fluorides in saturated, aqueous solution to a quantity of 0.5–1% by weight of the weight of cement used, are added to the mixing water, and the concrete prepared therewith. Abutments, pillar heads and pillar bases and supporting walls produced with such concrete, even after long observation periods, no longer exhibit blooms and efflorescence due to leaching out, steeping, gypsiferous and $CO_2$-containing waters.

*Example for use in connection with road construction.*—For producing concrete for road surfaces there are used silicon fluorides in saturated, aqueous solution which are added to the mixing water in the proportion of 0.5–1% by weight of the weight of cement used. The concrete road surface thus obtained is distinguished by a high degree of frost resistance.

*For underwater structures.*—It is sufficient to use an addition of silicon fluorides in saturated, aqueous solution in the proportion of 0.3% by weight of the weight of cement used.

*For increasing the resistance against organic acids.*—It is sufficient to add silicon fluoride in the proportion of only 0.1% by weight of the weight of cement used.

*Special example for use in connection with road construction.*—For preparation of 1 cubic metre of concrete for road construction take 350 kg. Portland cement (water cement 0.42–0.45) and admixture and add 1.75 kg. magnesium silicon fluoride in saturated, aqueous solution to the commonly used mixing water. Cement, mixing water and admixture are then prepared in a concrete mixing drum in the usual manner to the concrete thus ready for use. The saturated aqueous solution of magnesium silicon fluoride can be obtained by dissolving crystal magnesium silicon fluoride in pure water until saturation is being obtained Instead of magnesium silicon fluoride also zinc silicon fluoride may be used and added to the saturated solution as well as aluminum silicon fluoride or any other silicon fluorides sole or in combination.

I claim:

1. In the production of corrosion-resistant cementitious building materials wherein a cementitious material mixture containing hydrate of lime is treated with mixing water, the step of adding to the mixing water a lime-binding agent consisting essentially of water-soluble fluosilicate in a proportion of 0.1–1% by weight relative to the weight of cementitious material in the mixture.

2. The process step as claimed in claim 1, wherein fluosilicate is added in a proportion of 0.1–1% weight relative to the weight of cementitious material in the mixture and in the form of an aqueous solution.

3. The process step as described in claim 1, wherein fluosilicate is added in the proportion of approximately 0.5–1% by weight relative to the weight of cementitious material in the mixture.

4. The process step as described in claim 1, wherein fluosilicate is added to the cementitious material mixture in a proportion of approximately 0.3% by weight relative to the weight of cementitious material in the mixture.

5. The process step as described in claim 1, wherein fluosilicate is added in a proportion of approximately 0.1% by weight relative to the weight of the cementitious material in the mixture.

6. In the production of corrosion-resistant cementitious building material wherein a cementitious material mixture containing hydrate of lime is treated with mixing water, the step of adding to the mixing water magnesium fluosilicate in amounts of from 0.1 to 1% by weight relative to the weight of the cementitious material in the mixture, said magnesium silicon fluoride being added in the form of a saturated aqueous solution.

7. In the production of corrosion-resistant cementitious building material wherein a cementitious material mixture containing hydrate of lime is treated with mixing water, the step of adding to the mixing water zinc fluosilicate in amounts of from 0.1 to 1% by weight relative to the weight of the cementitious material in the mixture, said zinc silicon fluoride being added in the form of a saturated aqueous solution.

8. In the production of corrosion-resistant cementitious building material wherein a cementitious material mixture containing hydrate of lime is treated with mixing water, the process step of adding to the mixing water aluminum fluosilicate in amounts of from 0.1 to 1% by weight relative to the weight of the cementitious material in the mixture, said aluminum silicon fluoride being added in the form of a saturated aqueous solution.

9. In the production of corrosion-resistant cementitious building material wherein a cementitious material mixture containing hydrate of lime is treated with mixing water, the step of adding to the mixing water a fluosilicate selected from the group consisting of the fluosilicates of magnesium, zinc and aluminum in amounts of from 0.1 to 1% by weight relative to the weight of the cementitious material in the mixture, said fluosilicate being added in the form of a saturated aqueous solution.

References Cited in the file of this patent

UNITED STATES PATENTS

| | | |
|---|---|---|
| 1,495,138 | Downes | May 20, 1924 |
| 1,904,640 | Windecker | Apr. 18, 1933 |
| 2,071,681 | Brownmiller | Feb. 23, 1937 |
| 2,493,930 | Ryan | Jan. 10, 1950 |

OTHER REFERENCES

Toropov et al.: Tsement, volume 19, No. 4, pages 12–16, in Chemical Abstracts, volume 48 (1954), item 3005b.

De Jonge: Ind. Vernice (Milan), volume 6, pages 76–9, 1952, in Chemical Abstracts, volume 46 (1952), item 9866b.